United States Patent
Zock et al.

(10) Patent No.: US 10,745,881 B2
(45) Date of Patent: Aug. 18, 2020

(54) METHOD OF MANUFACTURING A COMPOST FILTER SOCK THAT IS LINEARLY STABLE DURING FILLING

(71) Applicants: MKB Company, LLC, Groveport, OH (US); Volm Companies, Inc., Antigo, WI (US)

(72) Inventors: Michael A. Zock, Saxonburg, PA (US); Robert Frei, Antigo, WI (US)

(73) Assignee: MKB Company, LLC, Groveport, OH (US)

( * ) Notice: Subject to any disclaimer, the term of this patent is extended or adjusted under 35 U.S.C. 154(b) by 946 days.

(21) Appl. No.: 15/080,890

(22) Filed: Mar. 25, 2016

(65) Prior Publication Data
US 2016/0279541 A1 Sep. 29, 2016

Related U.S. Application Data

(60) Provisional application No. 62/138,264, filed on Mar. 25, 2015.

(51) Int. Cl.
| | |
|---|---|
| *E02D 17/20* | (2006.01) |
| *C02F 1/00* | (2006.01) |
| *B01D 39/08* | (2006.01) |
| *E02D 29/02* | (2006.01) |
| *C02F 103/00* | (2006.01) |
| *E02B 3/12* | (2006.01) |

(52) U.S. Cl.
CPC ......... *E02D 17/202* (2013.01); *B01D 39/083* (2013.01); *C02F 1/001* (2013.01); *E02D 29/0291* (2013.01); *C02F 2103/001* (2013.01); *C02F 2203/006* (2013.01); *E02B 3/125* (2013.01); *E02D 2300/0078* (2013.01); *Y10T 29/49602* (2015.01)

(58) Field of Classification Search
CPC .............. E02D 17/202; E02D 29/0291; E02D 2300/0078; B01D 39/083; C02F 1/001; C02F 2103/001; C02F 2203/006; E02B 3/125; Y10T 29/49604
See application file for complete search history.

(56) References Cited

U.S. PATENT DOCUMENTS

| | | |
|---|---|---|
| 2,079,779 A | 5/1937 | Tullis |
| 2,123,620 A * | 7/1938 | Wolfson .................. D03D 3/00 |
| | | 139/383 R |
| 2,201,279 A | 5/1940 | Willing |
| 3,617,566 A | 11/1971 | Oshima et al. |
| 3,739,913 A | 6/1973 | Bogosian |

(Continued)

*Primary Examiner* — Sarang Afzali
(74) *Attorney, Agent, or Firm* — Blynn L. Shideler; Krisanne Shideler; BLK Law Group

(57) ABSTRACT

A compost filter netting comprises plastic netting formed in a tube having a diameter of 6"-36" wherein the plastic netting includes netting openings of ⅛-⅜" and configured to be filled with compost to form a compost filter sock, wherein the linear length of the compost filter sock is not less than 93% of the linear length of the originally manufactured empty compost filter netting. A method of forming a compost filter sock using the compost filter netting and the compost filter sock made thereby is disclosed. The compost filter netting substantially eliminates the problem of miscalculation of shrink rate that is problematic for in field applications.

11 Claims, 3 Drawing Sheets

(56) References Cited

U.S. PATENT DOCUMENTS

| | | | |
|---|---|---|---|
| 3,957,098 A | | 5/1976 | Hepworth et al. |
| 4,044,525 A | | 8/1977 | Forsgren |
| 4,366,067 A | | 12/1982 | Golding et al. |
| 4,659,478 A | | 4/1987 | Stapelfeld et al. |
| 5,108,224 A | * | 4/1992 | Cabaniss ............... D03D 15/00 139/426 R |
| 7,168,485 B2 | * | 1/2007 | Johnson ................. E21B 43/08 166/207 |
| 7,226,240 B2 | | 6/2007 | Tyler |
| 7,452,165 B2 | | 11/2008 | Tyler |
| 2014/0242232 A1 | * | 8/2014 | McDonald ............ A22C 29/04 426/393 |
| 2015/0047298 A1 | | 2/2015 | Szebalskie, Sr. et al. |

\* cited by examiner

METHOD OF MANUFACTURING A COMPOST FILTER SOCK THAT IS LINEARLY STABLE DURING FILLING

RELATED APPLICATIONS

This application claims priority to U.S. Patent Application Ser. No. 62/138,264 filed Mar. 25, 2015, entitled "Compost Filter Netting that is Linearly Stable During Filling" which is incorporated herein by reference.

BACKGROUND INFORMATION

1. Field of the Invention

The present invention relates to compost filter socks, and more particularly to compost filter netting that is linearly stable during filling, method of using the same and the compost filter socks formed thereby.

2. Background Information

The following is a detailed dissertation on compost filter socks in general leading to the specific problem addressed by the present invention, and should be helpful in understanding the specifics of the present invention.

A compost filter sock (also called a compost filter sleeve, or silt sleeve, or filter sock, compost filter tube, compost mesh sleeve, or similer terms) is a type of contained compost filter berm. A compost filter sock is a mesh tube or netting sleeve (referenced herein as compost filter netting) filled with mostly composted material and that is conventionally placed perpendicular to sheet-flow runoff to control erosion and retain sediment in disturbed areas.

The idea of an erosion control device formed as a mesh structure filled with compost material as the filler goes at least as far back as 1935 in a patent application by Mark S. Willing for a "means for preventing soil erosion." At that time, the time of the "dust bowl" in the central United States, soil erosion was a big problem in the United States and wind and water erosion was destroying large swaths of cropland. Mr. Willing's early compost filter sock U.S. Pat. Nos. 2,079,779 and 2,201,279, which are incorporated herein by reference, disclosed the use of brush or bundled weeds as the compost filler for these early compost filter socks.

Over the years improvements have been developed giving further detail to the desired compost filler material, the desired netting opening size for the compost filter netting, the length and diameter size of compost filter socks, filling arrangements and installation instructions. See, for example U.S. Pat. No. 3,957,098, which is incorporated herein by reference, disclosing a 1972 development referred to as "an erosion control bag" having a porosity of 10 to 35 cubic feet per minute so that air and water may escape from the bag as water and a filler are pumped into the bag. U.S. Pat. No. 4,044,525, which is incorporated herein by reference, discloses a 1975 development wherein wood chips are blown from the discharge tube of the wood chipper straight into a tube-like structure which has perforated walls allowing the air carrying the wood chips to escape from the structure while the chips are retained inside.

The oil skimming/spill absorbing field, which uses absorbent material (including compostable material) in netting, has also yielded improvements relevant to compost filter socks as evidenced in U.S. Pat. Nos. 3,617,566, 3,739,913, 4,366,067, and 4,659,478, which are incorporated herein by reference.

Within the last 30 years, tubular compost filter socks filled with straw and hammered wood have been introduced. In the late 1990's filter berms where introduced. The filter berm was basically a triangular windrowed pile of decomposing organic material from land clearing, tree-trimming, or other sources. Some of the people doing work early in the evolution and proliferation and re-introduction of modern compost filter sock were John Engwer at FilterMitt, Kevin Lane at Lane ECS, Tom Truelsen at Soil Tek, Rod Tyler at Filtrexx, Keith and Kevin Weaver at Weaver Express, and Doug Cadwell at River Valley Organics. Soon a "modern day" tubular mesh fabric, or compost filter netting, holding in place the berm material was introduced and the term "Compost Filter Sock" began to be widely used. Today's compost filter sock is, however, a modern day version of the original Willing patents.

Maine was one of the first states to embrace compost filter socks and associated standards. In the past 10-15 years, other states have followed suit. As of mid-2014, at least one Standard Setting Organization (SSO) in every state has adopted a "Compost Filter Sock" standard. For a representative example that is incorporated herein by reference consider Pennsylvania's Department of Environmental Protection's standards for compost filter sock aspects including netting, compost and installations spelled out in "Erosion and Sediment Control Best Management Practices."

The modern compost filter socks are typically oval in cross section, once formed, although the compost filter netting is often circular in cross section prior to filling. A compost filter sock, provides a three-dimensional filter that retains sediment and other pollutants (e.g., suspended solids, nutrients, and motor oil) while allowing the cleaned water to flow through. For reference see Faucette, et al. 2005. *Evaluation of Stormwater from Compost and Conventional Erosion Control Practices in Construction Activities*, Journal of Soil and Water Conservation, 60:6, 288-297; and Tyler, R. and B. Faucette 2005. *Organic BMPs used for Stormwater Management—Filter Media Test Results from Private Certification Program Yield Predictable Performance*, U.S. Composting Council $13^{th}$ Annual Conference and Trade Show, January 2005, San Antonio, Tex.

The compost filter socks are used in place of a traditional sediment and erosion control tools, such as a silt fence or straw bale barrier. Composts used in compost filter socks are conventionally made from a variety of feed-stocks, including municipal yard trimmings, food residuals, separated municipal solid waste, bio-solids, and manure. Compost filter socks are generally placed along the perimeter of a site, or at intervals along a slope, to capture and treat storm-water that runs off as sheet flow. Compost filter socks are flexible and can be filled in place or pre-filled and moved into position, making them especially useful on steep or rocky slopes where installation of other erosion control tools is not feasible. There is greater surface area contact with soil than typical sediment control devices, thereby reducing the potential for runoff to create rills under the device and/or create channels carrying unfiltered sediment. Additionally, compost filter socks can be laid adjacent to each other, perpendicular to storm-water flow, to reduce flow velocity and soil erosion. Compost filter socks can also be used on pavement as inlet protection for storm drains and to slow water flow in small ditches.

Compost filter socks used for erosion control are most commonly 12 inches in diameter, although 8 inch, 18 inch, 24 inch and even 36 inch diameter compost filter socks are used in some applications. The smaller 8 inch diameter filter socks are commonly used as storm-water inlet protection.

The "diameter" of the compost filter sock is typically given as the diameter of the unfilled compost filter netting used to form the compost filter sock, because when the compost filter sock is in position, gravity will make the cross section take an oval or "D" shape in which the width of the compost filter sock exceeds the original diameter and the height of the compost filter sock is less than the original diameter.

Compost filter socks can be what are termed "vegetated" or "un-vegetated". Vegetated compost filter socks can be left in place to provide long-term filtration of storm-water as a post-construction best management practice. The vegetation grows into the slope, further anchoring the compost filter sock. Un-vegetated compost filter socks are often cut open (cutting through the netting) when the project is completed, and the compost filling is spread around the site as soil amendment or mulch. The compost filter netting is then disposed of unless it is biodegradable.

According to the U.S. Environmental Protection Agency's National Pollutant Discharge Elimination System description of Construction Site Storm-water Runoff Control, three advantages the compost filter sock has over traditional sediment control tools, such as a silt fence, are: i) Installation does not require disturbing the soil surface (no trenching), which reduces erosion; ii) It is easily removed; and iii) The operator must dispose of only a relatively small volume of material, if any. These advantages lead to cost savings, either through reduced labor or disposal costs.

Further, the use of compost provides additional benefits. The compost retains a large volume of water, which helps prevent or reduce rill erosion and aids in establishing vegetation on the filter sock. The mix of particle sizes in the compost filter material retains as much, or more, sediment than traditional perimeter controls, such as silt fences or hay bale barriers, while allowing a larger volume of clear water to pass through. Silt fences often become clogged with sediment and form a dam that retains storm-water, rather than letting the filtered storm-water pass through. In addition to retaining sediment, compost can retain pollutants such as heavy metals, nitrogen, phosphorus, oil and grease, fuels, herbicides, pesticides, and other potentially hazardous substances—improving the downstream water quality. Nutrients and hydrocarbons adsorbed and/or trapped by the compost filter can be naturally cycled and decomposed through bioremediation by microorganisms commonly found in the compost matrix.

Compost filter socks are applicable to construction sites or other disturbed areas where storm-water runoff occurs as sheet flow. Common industry practice for compost filter devices is that drainage areas do not exceed 0.25 acre per 100 feet of device length and flow does not exceed one cubic foot per second. Compost filter socks can be used on steeper slopes with faster flows if they are spaced more closely, stacked beside and/or on top of each other, made in larger diameters, or used in combination with other storm-water controls, such as compost blankets. Once the compost filter sock is filled and put in place, it should be anchored to the slope. The preferred anchoring method is to drive stakes through the center of the sock at regular intervals; alternatively or in addition, stakes can be placed on the downstream side of the sock. The ends of the compost filter sock should be directed upslope, to prevent storm-water from running around the end of the sock. The compost filter sock may be vegetated by incorporating seed into the compost prior to placement in the filter sock. Since compost filter socks do not have to be trenched into the ground, they can be installed on frozen ground or even on cement or other "inhospitable" surfaces.

Compost filter socks offer a large degree of flexibility for various applications. A large number of qualitative studies have reported the effectiveness of compost filter socks in removing "settleable" solids and total suspended solids from storm-water. These studies have consistently shown that compost filter socks are generally more effective than traditional erosion and sediment control systems. Compost filter socks are often used in conjunction with compost blankets to form a storm-water management system. Together, these two systems retain a very high volume of storm-water, sediment, and other pollutants. For further background see, Alexander, R. 2003. *Standard Specifications for Compost for Erosion/Sediment Control* developed for the Recycled Materials Resource Center, University of New Hampshire, Durham, N.H.; Alexander, R. 2001. *Compost Use on State Highway Applications*, Composting Council Research and Education Fund and U.S. Composting Council, Harrisburg, Pa.; AASHTO. 2003 Standard Specifications for Transportation Materials and Methods of Sampling and Testing, Designation MP-9, Compost for Erosion/Sediment Control (Filter Berms), Provisional, American Association of State Highway Officials, Washington, D.C.; Glanville et al. 2003. *Impacts of Compost Blankets on Erosion Control, Revegetation, and Water Quality at Highway Construction Sites in Iowa*, T. Glanville, T. Richard, and R. Persyn, Agricultural and Biosystems Engineering Department, Iowa State University of Science and Technology, Ames, Iowa; Juries, D. 2004. *Environmental Protection and Enhancement with Compost*, Oregon Department of Environmental Quality, Northwest Region; McCoy, S. 2005. Filter Sock Presentation provided at Erosion, *Sediment Control and Stormwater Management with Compost BMPs Workshop*, U.S. Composting Council 13th Annual Conference and Trade Show, January 2005, San Antonio, Tex.; MnDOT. 2005. *Storm Drain Inlet Protection Provisions, S-5.5 Materials, B. Compost Log*, Minnesota Department of Transportation, Engineering Services Division, Technical Memorandum No. 05-05-ENV-03, Jan. 18, 2005; ODEQ. 2004. Best Management Practices for Stormwater Discharges Associated with Construction Activity, Guidance for Eliminating or Reducing Pollutants in Stormwater Discharges, Oregon Department of Environmental Quality, Northwest Region; USCC. 2001. *Compost Use on State Highway Applications*, U.S. Composting Council, Washington, D.C; USEPA. 1998. *An Analysis of Composting as an Environmental Remediation Technology*. U.S. Environmental Protection Agency, Solid Waste and Emergency Response (5305W), EPA530-R-98-008, April 1998; and W&H Pacific. 1993. Demonstration Project Using Yard Debris Compost for Erosion Control, Final Report, presented to Metropolitan Service District, Portland, Oreg.

The details of making the conventional compost filter socks are also described in some detail in U.S. Pat. Nos. 7,226,240 and 7,452,165 which are incorporated herein by reference. Additionally advantageous packaging of compost filter sock netting is disclosed in U.S. Published Patent Application No. 2015-0047298 which is incorporated herein by reference.

Compost filter socks are often assembled by tying a knot in one end of the compost filter netting, filling the compost filter netting with the composted material, typically usually using a pneumatic blower then knotting the other end of the compost filter netting once the desired length is reached. Often this is done in-situ by having a pneumatic blower on site, which in this context is also called a blower truck as it is typically mounted on a vehicle. The appropriate compost is delivered to the site in bulk, or manufactured at the site (which minimizes waste removal from vegetation removal during site preparation), or a combination of these. The compost filter netting is also delivered to the site and typically comes in large rolls or coils. The operator of the pneumatic blower must unravel an entire length of the compost filter netting from the coil, and then load the entire desired compost filter netting length onto the nozzle of the blower to form what is referenced herein as a compression bundle. Once "loaded" the leading end is pulled from the nozzle and a knot is provided in the end before beginning filing. The trailing end is knotted after the compost filter sock of the desired length is formed.

The conventional plastic compost filter nettings, however, have a design that results an excessive amount of linear shrinking during filling, sometimes up to 40% and the amount of "shrinkage" is often quite variable. Conventional plastic compost filter nettings for compost filter socks will stretch out radially as they are being filled and will consequently and simultaneously shorten in length. This leads to the problem of having the site manager properly calculate the shrinkage rate when ordering sufficient length of compost filter netting. The high variability in shrinkage rates for even the same brand of compost filter netting has resulted in a large number of miscalculations and shortage of compost filter netting. The result of under calculation of shrinkage is schematically shown in FIG. 1. A job is laid out, for example as generally shown in FIG. 3, and the plastic compost filter netting is ordered, but excessive shrinkage has the in situ manufactured compost filter sock 10 come up short of the planned length as shown. For the site plan the missing portion of compost filter sock 10 is filled in with a supplemental filter sock 10'. The compost filter netting for the supplemental sock 10' is typically overnighted or otherwise expressly delivered to the site at high shipping rates, but the true cost of the miscalculation is in the idle equipment (e.g., the blower truck) and work crew who must be maintained for a full extra day for a minor additional installation.

Those making an under-calculation on shrinkage that results in the substantial increase in labor and equipment rental costs (and minor increase in compost filter netting costs) will typically not make such a mistake again, but rather will build in excessive shrinkage factors in subsequent jobs, which results in excessive waste in compost filter netting purchased per future job. The UV degradation characteristics of compost filter netting may make it difficult for some contractors to easily reuse excess compost filter netting for a subsequent job, meaning the extra ordered compost filter netting due to overcompensation for shrinkage is merely lost.

The above discussion of miscalculation of shrinkage was assuming the user properly filled the compost filter netting. A separate issue of flattening during the functional longevity period should be mentioned. Flattening during the functional longevity period or undue flattening means that the installed compost filter sock does not satisfy the height requirements of the plan during the relevant use period, i.e. the sock has unduly "flattened" out. If it is below the minimum height requirements the filter sock will not function as designed. Further the installer may be subject to fines for such failures. Flattening has been found to be caused by under filling that may be caused by undersized cone and/or excessive linear tension (tugging) during filling. For this reason under filling is generally avoided and overfilling is more often a problem. Additionally, if the compost is more chip than shred and the compost filter sock goes through several freeze/thaw cycles, the sock may flatten and this can be exacerbated by weak radial support in the netting material.

As noted, in practice overfilling of the netting material is actually encountered more often in practice and the netting material will "balloon" out and waste filler material and overstress the netting material, and makes finished length even more unpredictable. A lack of radial stability results in a greater prevalence to overfilling.

There remains a need in the art for plastic compost filter netting that exhibits linear stability (e.g., minimizes shrinkage) and radial stability (i.e. minimize circumferential or diametrical changes) during filling to facilitate the construction of compost filter socks in situ.

SUMMARY OF THE INVENTION

This invention is directed to a compost filter netting comprises netting, generally of a man made synthetic material, formed in a tube having a diameter of 6"-36" wherein the netting includes minimum netting openings of typically ⅛-⅝", more preferably ⅛ to ⅜", and configured to be filled with compost to form a compost filter sock, wherein the linear length of the compost filter sock is not less than 93%, and preferably not less than 95%, and generally at least 98% of the linear length of the originally manufactured empty compost filter netting. A method of forming a compost filter sock using the compost filter netting and the compost filter sock made thereby is disclosed. The compost filter netting substantially eliminates the problem of miscalculation of shrink rate that is problematic for in field applications.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

Figure 1:
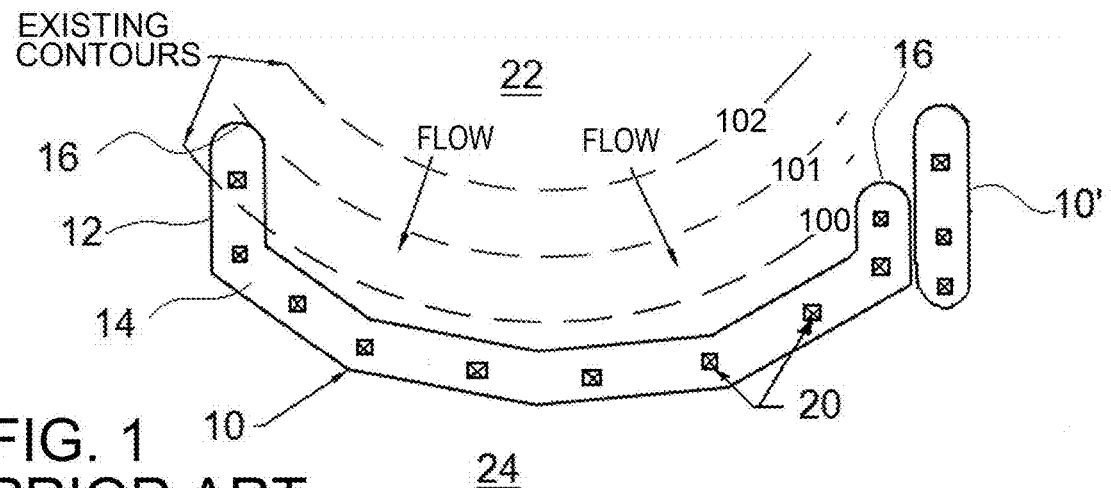
FIG. 1 is a schematic top view of an installed compost filter sock of the prior art illustrating typical miscalculation of netting shrinkage.
Figure 4:
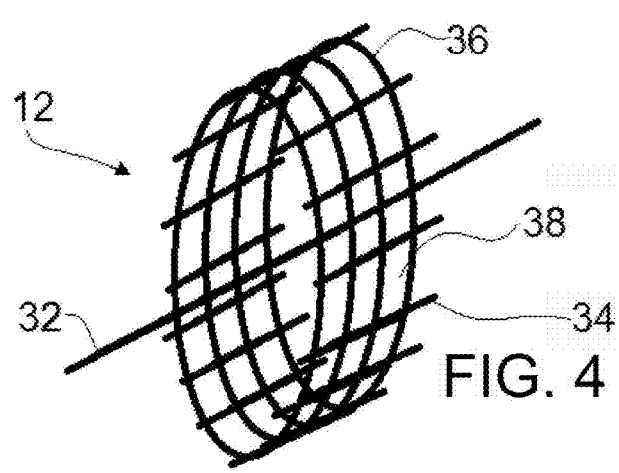
FIG. 4 is an enlarged schematic view of the compost filter netting according to the present invention.
Figure 2:
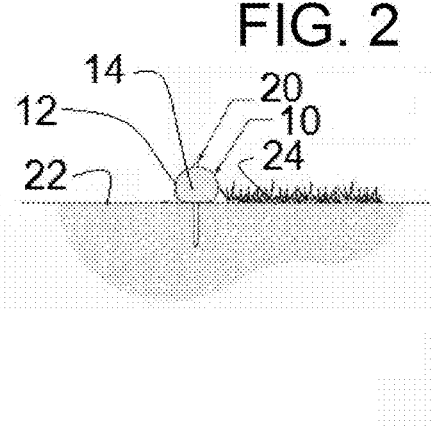
FIG. 2 is a schematic section elevation view of an installed compost filter sock according to the present invention.
Figure 3:
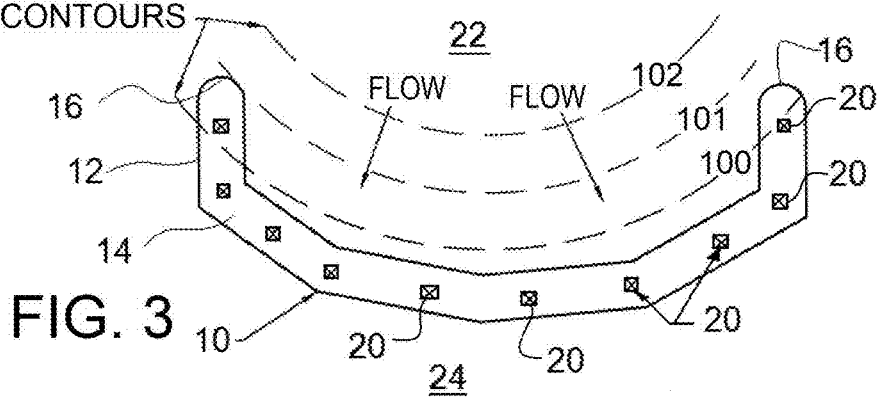
FIG. 3 is a schematic top view of an installed compost filter sock according to the present invention.

FIGS. 2-8A illustrate a compost filter sock 10 according to the present invention. The sock 10 of the present invention is a warp knitted structure as described below and shown schematically in FIG. 8A, as opposed to a circular knitted structure of common prior art compost filter socks which is shown schematically in FIG. 8B. These views illustrate that the compost sock 10 according to the present invention can be utilized and placed in a conventional fashion and operate as substantially conventional compost filter socks after filling. Namely the compost filter sock 10 may be staked in position with stakes 20 driven through the compost filter netting 12 and compost 14 at spaced locations along the sock 10 to secure the sock 10 at a desired location between the disturbed area 22 and the undisturbed area 24 for proper runoff control. As described below the sock 10 of the present invention may have visible indicia 44 integrated into the sock to indicate the desired location of the stakes 20, e.g., every 10 feet of sock 10. The specifics for a given sock 10 will be spelled out by a site plan for a given job, a representative arrangement of which is shown in FIG. 3 and will be generally known to those of skill in the art.

The compost filter sock 10 comprising netting 12 formed in a tube having a diameter of 6"-36" wherein the netting 12 includes minimum netting openings 38 of typically ⅛-⅝", and preferably ⅛-⅜", and compost filling 14 the compost filter netting 12. The netting 12 is preferably formed from manmade synthetic yarns or materials, such as polyolefin or polyamide materials. Acceptable polyolefin materials include PP and PE materials.

The mesh opening 38 size is significant for a proper compost filter sock 10 as if the openings 38 are too small, the sock 10 "blinds"; and if the openings 38 are too big, the compost 14 washes or falls out. The openings 38 may be formed as a straight forward ⅛"-⅜" inch square, ⅛"-⅜" hex, or ⅛"-⅜" round. The preferential warp knitted structure described below and shown in FIGS. 5A-B yields an elongated triangle for openings 38 that are about ⅜" long, about 3/16" wide at the fat end tapering to about ⅛" at the narrow end, and quite effective openings 38 for compost filter netting 12. For precision it is noted that for round openings 38 the linear measurement given is normally of the diameter, or largest diameter for an oval. Similarly the linear measurement is generally the diameter for hexagon shaped openings and anything higher order than a rectangle (octagon, heptagon, etc). For a rectangle or a triangle shaped opening the linear measurement is typically associated with a major or longest side.

Figure 8A:
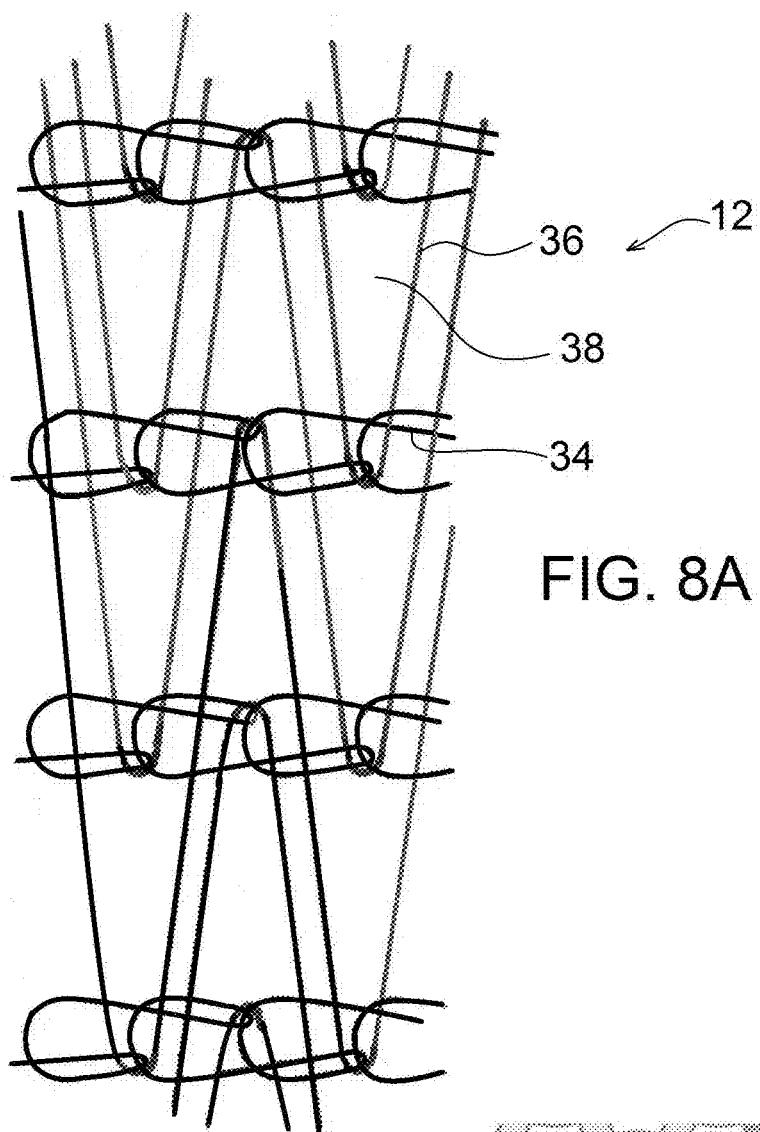
FIG. 8A is a schematic representation of the warp knitting technology used for forming the compost filter netting of the present invention.
Figure 8B:
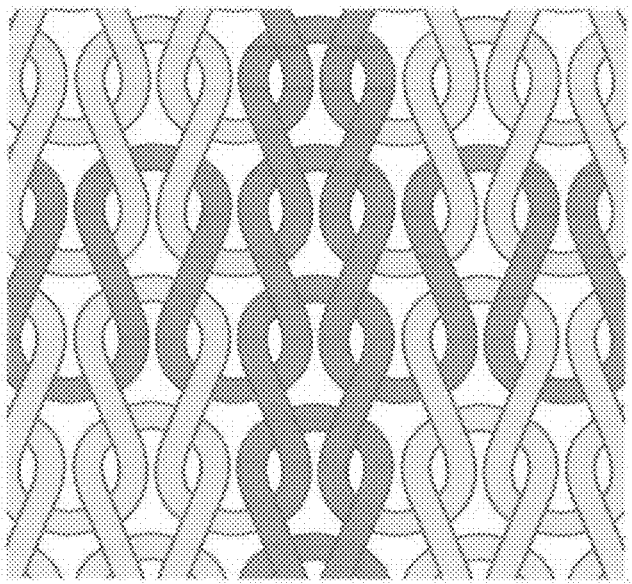
FIG. 8B is a schematic representation of circular knitting technology used to form the compost filter netting of the prior art.

A key aspect of the present invention is that the linear length of the compost filter sock 10 when fully filled is not less than 93% of the linear length of the empty or originally manufactured compost filter netting 12. This aspect of the invention is referenced as linear stability, and a compost filter sock 10 that exhibits a linear length of the compost filter sock 10 which is not less than 93% of the linear length of the empty or originally manufactured compost filter netting 12 when filled to a full capacity will be considered to exhibit linear stability within the meaning of this application. FIG. 8A is a schematic representation of the warp knitting technology used for forming the compost filter netting 12 of the present invention and FIG. 8B is a schematic representation of circular knitting technology used to form the compost filter netting of the prior art. Warp knitting technology used in the present invention exhibits the radial and linear its stability because the warp thread 34 stitches are effectively independent of the adjacent warp thread 34 stitches resulting in stability in the warp and weft direction, whereas in circular knitting the rows of stitches in the weft direction are made of the same continuous yarn and exhibits less stability for forces applied in that direction. In the circular knitting as shown the weft direction is left to right and as force is applied in the weft direction the material elongates in the weft direction (radially unstable) and shortens in the warp direction (linearly unstable) thereby not exhibiting the desired stability.

The ends 16 of the netting 12 are sealed, such as by knotting, and the linear length of the compost filter sock 10 is defined as the length measured from one end 16 to the other end 16 along the axis 32 of the netting 12. The length of the prefilled compost filter netting 12, for calculation of linear stability, will be from the location of the one end 16 to the other end 16 along the axis 32 of the prefilled netting 12. The compost filter sock 10 according to the invention preferably exhibits a linear length of the compost filter sock 10 when the netting 12 is filled to a full capacity which is not less than 95% of the length of the empty or originally manufactured compost filter netting 12. More preferably the sock 10 when filled to a full capacity exhibits a linear length of which is not less than 97% of the length of the empty or originally manufactured compost filter netting 12. In testing a linear length of the compost filter sock 10 when filled to a full capacity was not less than 98% of the length of the empty or originally manufactured compost filter netting 12.

Figure 7:
FIG. 7 is a schematic illustration of visible stake placement indicia in the compost filter netting of a compost filter sock according to the present invention.

FIG. 7 is a schematic illustration of integrated visible stake placement indicia 44 in the compost filter netting 12 of a compost filter sock 10 according to the present invention. As the sock 10 of the present invention is linearly stable as discussed above due to the use of warp knitted structure as shown and described, it can include integral stake indicia (e.g., every 10 feet), within the netting 12. These are not meaningful or possible with the prior art sock structures because after filling any such preformed indicia would not be spaced at known locations (e.g. 10 ft indicia on an original prior art sock may end up being 6 ft apart after filling due to 40% shrinkage or any number between 6 ft and 10 ft). Specifically in FIG. 7 the integrated visible stake placement indicia 44 in the compost filter netting 12 of a compost filter sock 10 is formed by a distinctly colored thread 35 (e.g., an orange thread) that follows a warp thread 34 (not shown in FIG. 7 for clarity) and then inlays back and forth between two adjacent warp threads 34 at the appropriate intervals to form the indicia 44. Warp knitting technology can easily and effectively add distinct visible threads at any location in the netting 12 as known in the art to form the indicia 44, but it is the linear stability that allows these to be added in a meaningful manner. The indicia 44 also serve as a sock 10 length measurement tool for users and inspectors, separate from stake placement. It is anticipated that multiple threads 35 (e.g., 4-8) would be spaced circumferentially around the netting 12 to form rows of indicia 44 such that the indicia 44 would always be visible to users regardless of how a particular sock 10 is positioned on the ground.

Figure 6:
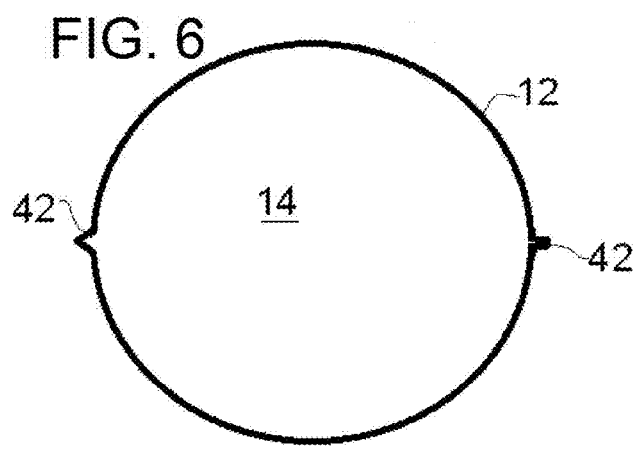
FIG. 6 is a schematic illustration of expansion pleats in the compost filter netting of a compost filter sock according to the present invention.

The compost filter sock 10 according to the invention preferably exhibits a radial stability, wherein the circumference of the empty or originally manufactured compost filter netting 12 is at least 90% of the circumference of the compost filter sock 10 when filled to a full capacity, and preferably the circumference of the empty or originally manufactured compost filter netting 12 is at least 95% of the circumference of the compost filter sock 10 when filled to a full capacity. This measurement does not include the use or deployment of expansion pleats 42 as shown in FIG. 6.

Damage to the netting 12 of the present invention, with this increased radial stability, due to overfilling is prevented with a pair (or more) of expansion pleats 42. Each expansion pleat 42 is a ⅓" pinched or doubled area of netting that may be stitched or otherwise closed. FIG. 6 shows an expansion pleat 42 on the right that remains intact and an expansion pleat 42 on the left that is opening (the stitching or other fastening mechanism is failing). The fastening of the expansion pleat 42 is configured to fail at less than the radial tension capacity of the netting 12 so the expansion pleats 42 thus yield some radial expansion to the sock 10, if needed. The additional capacity of the netting 12 due to the pleats 42 is not considered in calculating the radial stability of the netting 12 which is a physical measurement or parameter of the netting 12 itself. Two ⅓" pleats 42 are shown but more may be included if desired. However, two pleats 42 is particularly well suited for forming the netting 12 on a RASCHELL Warp Knitted Double Needle Bar Machine.

The compost filter netting material 12 of the sock 10 is preferably formed of manmade synthetic material, such as polyolefin materials or polyamide materials. Suitable polyolefin materials include polyester or polypropylene or combinations thereof. Polyester and polypropylene netting materials 12 are easily scalable and still allow the compost filter netting 12 to satisfy the requirements of compost filter netting set by every state requirement. For example the requirements of compost filter netting set by the Pennsylvania Department of Environmental Protection, as of 2015, includes minimum requirements of "5 mil HDPE" (high density polyethylene) netting to be photodegradable, to have 12"-32" diameters, minimum mesh openings of ⅜", minimum tensile strength of 26 PSI, exhibit Ultraviolet stability of at least 23% original strength at 1000 hours (ASTM g-155 test), and have a minimum functional longevity of at least nine months; minimum requirements of Multi-filament Polypropylene (MFPP) netting to be photodegradable, to have 12"-32" diameters, minimum mesh openings of ⅜" (effective diameter), minimum tensile strength of 44 PSI, exhibit Ultraviolet stability of 100% original strength at 1000 hours (ASTM g-155 test), and have a minimum functional longevity of at least twelve months; and minimum requirements of Heavy Duty Multi-filament Polypropylene (HDMFPP) netting to be photodegradable, to have 12"-32" diameters, minimum mesh openings of ⅛" (effective diameter), minimum tensile strength of 202 PSI, exhibit Ultraviolet stability of at least 100% original strength at 1000 hours (ASTM g-155 test), and have a minimum functional longevity of at least twenty-four months. For reference the functional longevity is a combination of strength (tensile strength is the typical test—26 psi is minimum using ASTM 5035 test) and degradation (photo, oxo, oxo-bio, degradation—minimum is photo-based—23% retained strength at 1000 hours—ASTM G-155).

Figure 5A:
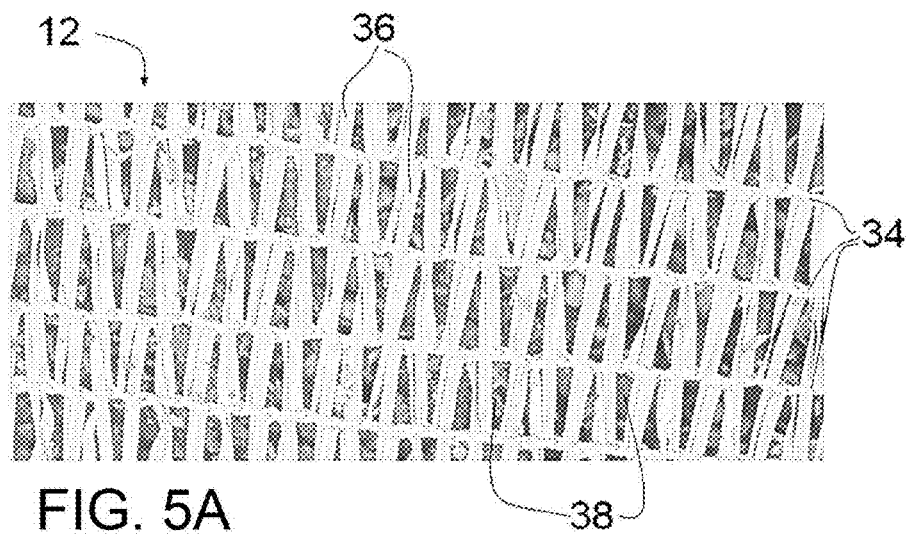
FIGS. 5A and B are enlarged images of a segment of the compost filter netting of a compost filter sock according to the present invention.
Figure 5B:
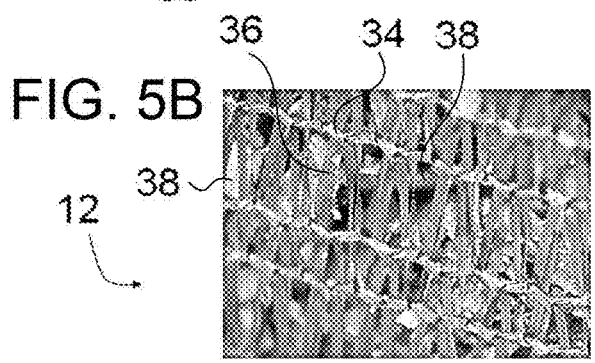

One embodiment of the present invention shown in FIGS. 5A and B utilizes 5-mil HDPE (wherein the 5-mil is a pre-stretched fiber diameter average), which is photodegradable according to Pennsylvania Department of Environmental Protection standards, has mesh openings of ⅜" according to Pennsylvania Department of Environmental Protection standards, has a tensile strength of 52 PSI according to ASTM 5034 procedures, exhibits a UV stability of 50% at 1000 hours, has a minimal functional longevity of 1 year.

One aspect of the present invention to achieve the linear stability of the netting 12 of the invention is wherein the compost filter netting 12 includes warp 34 and weft 36 threads wherein the warp threads 34 extend substantially longitudinally along the longitudinal axis 32 of the tube of netting 12 while the weft threads 36 extend generally perpendicular to the longitudinal axis 32 of the tube of netting 12. The arrangement of the warp 34 and weft 36 threads is analogous to the arrangement found in the LENO™ brand onion bags manufactured by a co-developer of the present technology, and the range of variation of the warp threads 34 from being parallel with the axis 32 (substantially longitudinally) or of the weft threads 36 extend generally perpendicular to the longitudinal axis 32 of the tube of netting 12 within the meaning of the present invention are defined in this bag forming technology. As noted above the netting 12 may be effectively formed using warp knitting technology on a RASCHELL Warp Knitted Double Needle Bar Machine.

"Grab Test" results (See ASTM D 5034) were conducted on socks 10 formed according to the present invention and which are shown in FIGS. 5A and B. These results demonstrate some of the strength advantages of the netting 12 and sock 10 of the present invention. The tests results demonstrated an average horizontal breaking strength (horizontal relative to the sock 10 on the ground—also called the Warp direction in these tests) of 28 lbf and an average vertical direction breaking strength (also called filling or cross direction in this test) of 56 lbf for a blended breaking strength of 42 lbf. This demonstrates significant strength and stability advantages with the netting 12 of the present invention.

The compost filter netting 12 of the present invention allows for effective and efficient use of an infield blower truck with a pneumatic nozzle. The method of manufacturing a compost filter sock 10 using the compost filter netting 12 includes the initial step of providing the compost filter netting 12 to the site. This may effectively be done in a vacuum packed unit as described in U.S. Published Patent Application No. 2015-0047298 which is incorporated herein by reference. The compost filter netting 12 is loaded or placed onto the pneumatic nozzle. Following this loading, one open end and a leading length of the compost filter netting 12 is removed or pulled from from the pneumatic nozzle while maintaining the opposite end and the remainder of the compost filter netting 12 on the pneumatic nozzle. The next step for forming a compost filter sock 10 is sealing the leading open end 16 such as by simply tying a knot in the leading length. The compost filter sock 10 is formed in a conventional fashion by filling the compost filter netting 12 with compost 14 to a full capacity using the nozzle and a supply of compost from a hopper or storage area. After a compost filter sock 10 of a desired length has been formed the trailing end 16 of the netting material 12 is sealed, such as by another knot.

If there is a substantial length of unused compost filter netting 12 after formation of the compost filter sock 10 of a desired length then the material may be severed, generally near where the trailing knot 26 is to be formed and the remaining length of material 12 forming a reusable remnant. However, the present invention is designed to minimize substantial lengths of unused compost filter netting 12 due to miscalculations of shrinkage or intentional over calculations of shrinkage. More significantly, the present invention intends to minimize the likelihood of user running out of compost filter netting 12 prior to the required length of finished fully filled compost filter sock 10.

While the invention has been shown in several particular embodiments it should be clear that various modifications may be made to the present invention without departing from the spirit and scope thereof. The scope of the present invention is defined by the appended claims and equivalents thereto.

What is claimed is:

1. A method of manufacturing a compost filter sock that is linearly stable during filling, comprising the steps of:

providing a warp knitted compost filter netting comprising netting formed in a tube having a diameter of 6 inches to 36 inches wherein the netting includes netting openings and of an original manufactured linear length, wherein the compost filter netting includes warp and weft threads, and wherein the warp threads extend longitudinally along the longitudinal axis of the tube and substantially parallel to each other while the weft threads extend perpendicular to the longitudinal axis of the tube;

sealing a first end of the compost filter netting;

filling the compost filter netting with compost to full capacity to form a compost filter sock; and sealing a second end of the compost filter netting, wherein a linear length of the compost filter sock is not less than 93% of the original manufactured linear length of the compost filter netting.

2. The method of manufacturing a compost filter sock according to claim 1 wherein the circumference of the originally manufactured empty compost filter netting is at least 90% of the circumference of the compost filter sock.

3. The method of manufacturing a compost filter sock according to claim 2 further including the step of providing an integral stake mounting indicia in the sock formed by a distinctly colored thread inlaid between two warp threads at the appropriate intervals to form the indicia in the compost filter netting.

4. The method of manufacturing a compost filter sock according to claim 3 wherein the linear length of the compost filter sock is not less than 95% of the length of the originally manufactured empty compost filter netting.

5. The method of manufacturing a compost filter sock according to claim 4 wherein the circumference of the originally manufactured empty compost filter netting is at least 95% of the circumference of the compost filter sock.

6. The method of manufacturing a compost filter sock according to claim 1 wherein the netting is formed of a polyolefin or a polyamide material.

7. The method of manufacturing a compost filter sock according to claim 6 further including providing at least one expansion pleat within the sock.

8. A method of manufacturing a compost filter sock that is linearly stable during filling, comprising the steps of:

A) providing a warp knitted manmade synthetic netting formed in a tube having a diameter of 6 inches to 36 inches wherein the manmade synthetic netting includes netting openings and of an original manufactured linear length, wherein the manmade synthetic netting includes warp and weft threads, and wherein the warp threads extend longitudinally along the longitudinal axis of the tube and substantially parallel to each other, while the weft threads extend perpendicular to the longitudinal axis of the tube, and providing compost for filling the manmade synthetic netting;

B) placing the manmade synthetic netting on a pneumatic nozzle;

C) sealing one end of the manmade synthetic netting on the pneumatic nozzle while maintaining the opposite end and the remainder of the manmade synthetic netting on the pneumatic nozzle;

D) filling the manmade synthetic netting with compost to full capacity; and

E) sealing the remaining open end of the manmade synthetic netting, wherein the linear length of the compost filter sock from the one sealed end to the opposed sealed end is not less than 93% of the linear length of the originally manufactured linear length of the manmade synthetic netting from the same two points forming the sealed ends.

9. The method of manufacturing a compost filter sock according to claim 8 wherein the circumference of the originally manufactured manmade synthetic netting is at least 90% of the circumference of the compost filter sock.

10. The method of manufacturing a compost filter sock according to claim 9 wherein the manmade synthetic netting is one of polyolefin or polyamide and further including integral stake mounting indicia in the sock formed by a distinctly colored thread inlaid between two warp threads at the appropriate intervals to form the indicia in the manmade synthetic netting.

11. The method of manufacturing a compost filter sock according to claim 10 wherein the linear length of the compost filter sock is not less than 95% of the length of the originally manufactured manmade synthetic netting, and wherein the circumference of the originally manufactured manmade synthetic netting is at least 95% of the circumference of the compost filter sock, and further including at least one expansion pleat within the sock.

* * * * *